B. ARNOLD.
DIFFERENTIAL CHAIN FOR PULLEY-BLOCKS.
No. 187,745. Patented Feb. 27, 1877.
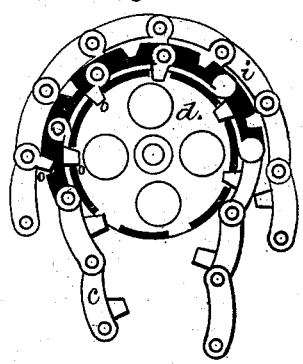
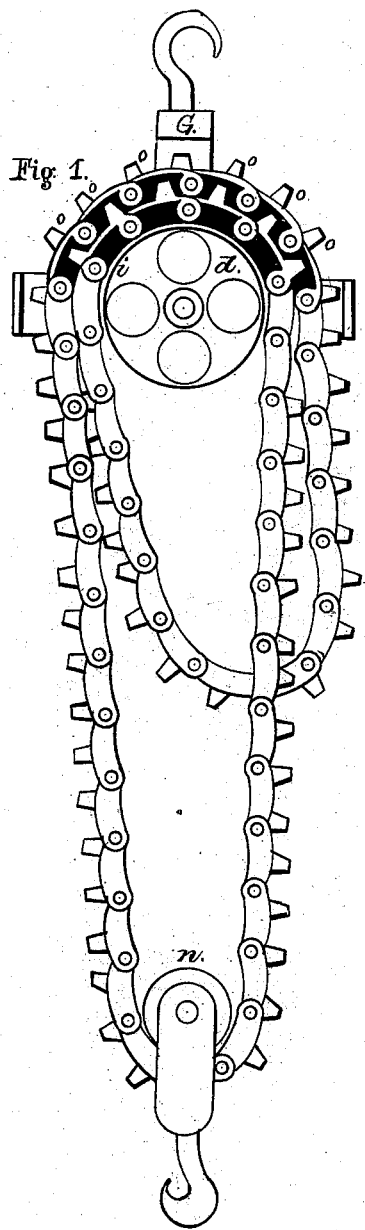
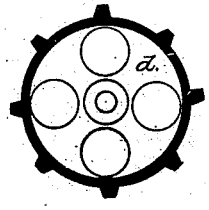
James E. Arnold,
Frank H. Arnold,
Benj. Arnold

UNITED STATES PATENT OFFICE.

BENJAMIN ARNOLD, OF EAST GREENWICH, RHODE ISLAND.

IMPROVEMENT IN DIFFERENTIAL CHAINS FOR PULLEY-BLOCKS.

Specification forming part of Letters Patent No. 187,745, dated February 27, 1877; application filed January 3, 1877.

*To all whom it may concern:*

Be it known that I, BENJAMIN ARNOLD, of East Greenwich, in the county of Kent and State of Rhode Island, have invented a new and useful Improvement in Differential Chains for Pulley-Blocks, &c., which improvement is fully set forth in the following specification and drawings.

The object of my invention is to construct a chain that can be used double on a pulley without the upper portion being liable to slip on the under portion; and this is accomplished by putting projections on one side of the chain to enter recesses in the other, the distance between the projections being differential with regard to the distance between the recesses when the chain is straight.

In the drawings, Figure 1 shows a front elevation of a pulley-block with one plate removed and part of the chain shown in section. Fig. 2 shows a pulley with the chain reversed, or having the projections on the under side. Fig. 3 is a pulley with projections on its face.

In Fig. 1, $d$ is a pulley turning on an axle in the frame G. $c$ is the chain, with the projections $o\ o\ o$ on the outside of it.

As the projections on the under chain are to enter the recesses in the upper chain, and there being more links in the outer semicircle than there are in the inner one, it is necessary that the projections should be a less distance apart than from center to center of the chain-links when straight.

In Fig. 2 the chain is shown reversed, or with the projections on its inner side, in which case the distance between the projections must be greater than the distance between the centers of the links, because the projections and recesses have exchanged places in the arrangement. This forms what may be called a "differential chain"—a chain having differential projections that form a part of it. The proportion of the difference between the distance from one projection to another, and the distance between the centers of two links when the chain is straight, indicates the amount of gain or purchase when the chain is used over a pulley, as in Fig. 1.

By pulling on the slack chain to the right, the two chains will be drawn over the pulley, and as the upper chain takes up faster than the under one lets out, the bight or loop holding the pulley $n$ will be shortened, and a weight attached to the pulley raised.

Power may be applied to the pulley $d$ through the axle, or by any of the usual modes of gearing; but in case the chain is used with the projections on the outside, as in Fig. 1, the pulley $d$ should be made with projections on its face, as shown in Fig. 3, if the chains are to be driven by the pulley.

Having thus described my invention, what I claim as new, and desire to secure by Letters Patent, is—

1. The chain or belt $c$, provided with projections, the distances between which are differential with regard to the distances between the centers of the links or the recesses in them, substantially as and for the purpose herein set forth.

2. The combination of the chain $c$ with the pulleys $d$ and $n$, substantially as described, and for the purpose set forth.

BENJ. ARNOLD.

Attest:
JAMES E. ARNOLD,
FRANK H. ARNOLD.